(12) United States Patent
Doeren

(10) Patent No.: US 10,309,776 B2
(45) Date of Patent: Jun. 4, 2019

(54) LASER ALIGNMENT GUIDE

(71) Applicant: Paul Joseph Doeren, St. Charles, MO (US)

(72) Inventor: Paul Joseph Doeren, St. Charles, MO (US)

( * ) Notice: Subject to any disclaimer, the term of this patent is extended or adjusted under 35 U.S.C. 154(b) by 77 days.

(21) Appl. No.: 15/603,610

(22) Filed: May 24, 2017

(65) Prior Publication Data

US 2017/0343348 A1 Nov. 30, 2017

Related U.S. Application Data

(60) Provisional application No. 62/340,592, filed on May 24, 2016.

(51) Int. Cl.
*G01C 9/28* (2006.01)
*G01C 15/00* (2006.01)
*G01C 9/34* (2006.01)
*H02G 1/00* (2006.01)
*H02G 1/08* (2006.01)

(52) U.S. Cl.
CPC .............. *G01C 9/34* (2013.01); *G01C 9/28* (2013.01); *G01C 15/008* (2013.01); *H02G 1/00* (2013.01); *H02G 1/08* (2013.01)

(58) Field of Classification Search
CPC .. G01C 15/002; G01C 15/004; G01C 15/008; G01C 3/08; G01C 5/00
USPC ...................................................... 33/275 R
See application file for complete search history.

(56) References Cited

U.S. PATENT DOCUMENTS

| | | | | |
|---|---|---|---|---|
| 5,040,256 A | * | 8/1991 | Mills | B43L 23/08 30/138 |
| 5,379,524 A | * | 1/1995 | Dawson | B25F 1/00 33/333 |
| 5,394,616 A | * | 3/1995 | Claxton | G01C 15/002 33/275 R |
| 5,725,439 A | * | 3/1998 | Halsey | A63B 69/3614 362/259 |
| 6,178,649 B1 | * | 1/2001 | Wu | G01C 15/002 33/286 |
| 6,578,274 B1 | * | 6/2003 | Tango, Jr. | B44D 3/38 33/1 G |
| 6,643,019 B1 | * | 11/2003 | Jeanneret | G01C 15/105 33/286 |
| 6,941,605 B2 | * | 9/2005 | McCreesh | B25H 7/04 33/27.03 |
| 7,392,591 B2 | * | 7/2008 | Milligan | B25H 7/04 33/281 |
| 8,590,170 B2 | * | 11/2013 | Wagner | B43L 7/12 33/760 |
| 9,080,864 B1 | * | 7/2015 | McCarthy | G01C 15/004 |
| D827,461 S | * | 9/2018 | Doeren | D10/65 |

(Continued)

*Primary Examiner* — Yaritza Guadalupe-McCall
(74) *Attorney, Agent, or Firm* — Global Intellectual Property Agency, LLC; Daniel Boudwin

(57) ABSTRACT

A laser alignment guide. The laser alignment guide includes a housing having at least one sidewall and a base defining an interior volume therein. A cap is removably securable to an upper end of the housing. The cap further includes at least one light source that can emit a visible laser disposed thereon. A mounting bracket that can magnetically secure to a surface is disposed on a second end of the housing. In some embodiments, at least one light source is disposed on a sidewall of the housing.

14 Claims, 4 Drawing Sheets

(56) References Cited

U.S. PATENT DOCUMENTS

| | | | |
|---|---|---|---|
| 2002/0108261 A1* | 8/2002 | Miller | G01C 15/105 |
| | | | 33/283 |
| 2004/0123472 A1* | 7/2004 | Wu | G01C 15/00 |
| | | | 33/286 |
| 2004/0172839 A1* | 9/2004 | Zirk | B26B 1/04 |
| | | | 33/451 |
| 2004/0221470 A1* | 11/2004 | Lin | G01B 3/1084 |
| | | | 33/760 |
| 2005/0060901 A1 | 3/2005 | Cook | |
| 2006/0013278 A1* | 1/2006 | Raskin | G01C 15/004 |
| | | | 372/109 |
| 2006/0016083 A1* | 1/2006 | Huang | G01C 15/008 |
| | | | 33/286 |
| 2007/0204473 A1* | 9/2007 | Dillon | B23P 19/06 |
| | | | 33/286 |
| 2007/0283584 A1* | 12/2007 | Harari | G01C 15/008 |
| | | | 33/290 |
| 2008/0065348 A1 | 3/2008 | Dowd | |
| 2008/0256816 A1* | 10/2008 | Cosentino | B26B 5/001 |
| | | | 33/760 |
| 2010/0122466 A1* | 5/2010 | Hemingway | G01C 15/004 |
| | | | 33/228 |
| 2012/0117813 A1 | 5/2012 | Stevenson et al. | |
| 2012/0297635 A1* | 11/2012 | Mickow | G01C 15/002 |
| | | | 33/228 |
| 2013/0077081 A1 | 3/2013 | Lin | |
| 2014/0115907 A1* | 5/2014 | Gamon | G01C 15/004 |
| | | | 33/286 |
| 2016/0377428 A1* | 12/2016 | Schubert | G01C 9/10 |
| | | | 33/366.11 |
| 2017/0343348 A1* | 11/2017 | Doeren | G01C 9/28 |

* cited by examiner

LASER ALIGNMENT GUIDE

CROSS REFERENCE TO RELATED APPLICATIONS

This application claims the benefit of U.S. Provisional Application No. 62/340,592 filed on May 24, 2016. The above identified patent application is herein incorporated by reference in its entirety to provide continuity of disclosure.

BACKGROUND OF THE INVENTION

The present invention relates to laser alignment guides. Specifically, it relates to laser alignment guides that removably secures to a surface.

Many electricians and construction workers must determine the proper alignment and orientation for conduits to be installed. Traditionally, an offset bend is used to match the geometry of closely positioned objects without contacting a part of a structure or to bring a conduit out from the structure. Using this method, determining the angle of the bend in an offset can be time consuming and is frequently inaccurate. This leads to many wasted man hours and expense in trying to find the precise measurement. Therefore, a device that can assist with the precise alignment of conduits is needed.

In light of the devices disclosed in the known art, it is submitted that the present invention substantially diverges in design elements from the known art and consequently it is clear that there is a need in the art for an improvement to existing laser alignment guides. In this regard, the instant invention substantially fulfills these needs.

SUMMARY OF THE INVENTION

In view of the foregoing disadvantages inherent in the known types of laser alignment guide now present in the prior art, the present invention provides a laser alignment guide wherein the same can be utilized for providing convenience for the user when aligning conduits to match the geometry of closely positioned objects.

The present system comprises a housing having at least one sidewall and a base defining an interior volume therein. A cap is removably securable to an upper end of the conduit and further comprises at least one light source configured to emit a visible laser disposed thereon. A mounting bracket is disposed on a second end of the housing and is configured to removably secure the housing to a surface via magnetic attraction. In some embodiments, the device further comprises an etching tool having a blade configured to score the surface. In another embodiment, the device further comprises a blade sharpener configured to sharpen the blade of the etching tool. In other embodiments, the interior volume is configured to store the etching tool and the blade sharpener. In yet another embodiment, the housing further comprises a horizontal bubble level disposed on the sidewall thereof. In some embodiments, the sidewall further comprises a vertical bubble level disposed thereon. In another embodiment, the cap further comprises a vertical bubble level disposed thereon. In other embodiments, the device further comprises an activation switch disposed on the cap wherein the activation switch is in electrical communication with a power source and the light source. In yet another embodiment, the power source comprises a batter disposed within the interior volume of the housing. In some embodiments, the device further comprises a measuring tool configured to fit within the interior volume. In another embodiment, the measuring tool is telescopic. In other embodiments, the device further includes a reflective assembly configured to selectively reflect the laser emitted from the light source at various angles. In yet another embodiment, the reflective assembly selectively reflects the laser via rotation of the cap. In some embodiments, at least one light source is disposed on a sidewall of the housing.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
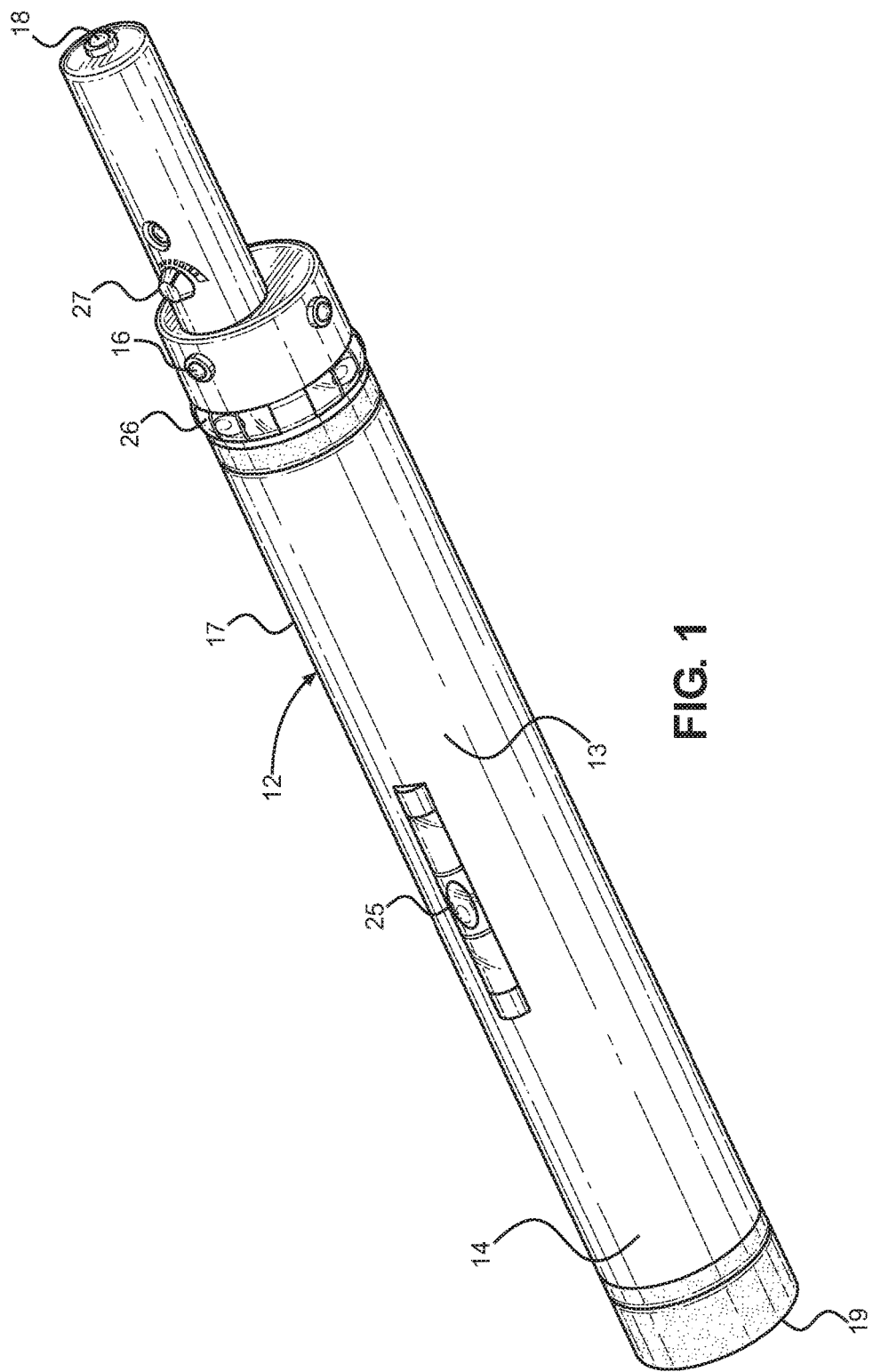
FIG. 1 shows a perspective view of an embodiment of the laser alignment guide.

Reference is made herein to the attached drawings. Like reference numerals are used throughout the drawings to depict like or similar elements of the laser alignment guide. The figures are intended for representative purposes only and should not be considered to be limiting in any respect.

Referring now to FIG. 1, there is shown a perspective view of an embodiment of the laser alignment guide. The laser alignment guide 11 comprises a housing 12 having a base 14, an upper end 17, and at least one sidewall 13 defining an interior volume. In the illustrated embodiment, the housing 12 further comprises a horizontal bubble level 25 disposed on the sidewall 13. The horizontal bubble level 25 is configured to determine whether the laser alignment guide 11 is perpendicular to the force of gravity. In some embodiments, a vertical bubble level 26 is disposed on the sidewall 13, wherein the vertical bubble level 26 is configured to determine whether the laser alignment guide 11 is parallel to the force of gravity. In this way, a user can determine whether the laser alignment guide 11 is aligned whether the laser alignment guide 11 is in a horizontal or vertical position. In another embodiment, the housing 12 further comprises a clip configured to removably secure the housing to an obstruction, such as a floor joist.

A cap 16 is disposed on the upper end 17 of the housing 12. The cap 16 is configured to removably secure to the upper end 17. In some embodiments, the upper end 17 further comprises external threading to engage with internal threading disposed on the cap 16 (seen in FIG. 2B). At least one light source 18 is disposed on the cap 16. In the illustrated embodiment, the cap 16 further comprises a vertical bubble level 26. The light source 18 is configured to emit a visible laser. In the illustrated embodiment, light sources 18 are distributed across an outer surface of the cap 16, such that multiple visible lasers are emitted at differing angles. In some embodiments, these light sources 18 are positioned such that the lasers emitted therefrom represent independent horizontal and vertical axes in three dimensions, representing the abscissa, ordinate, and applicate. In some embodiments, the cap 16 further comprises a reflective assembly configured to selectively reflect the lasers emitted from the light source 18 to a desired position. In other embodiments, the reflective assembly is configured to selectively reflect the lasers via rotation of the cap 16 perpendicular to the length of the housing 12.

The base 14 of the housing 12 is configured to removably secure to the housing 12. A mounting bracket 19 is disposed on the base 14 and is configured to engage with a surface. In the illustrated embodiment, the mounting bracket 19 is configured to removably secure to a surface via magnetic attraction. Additionally, the base 14 is configured to fit within various standard sizes of connectors for electrical metal tubing or conduit. In some embodiments, the laser alignment guide 11 further comprises a set of adaptors configured to removably secure to the base 14. The adaptors are dimensioned to fit within various standard sizes of conduit connectors, such that the laser alignment guide 11 can be removably secured within the connectors.

Figure 2A:
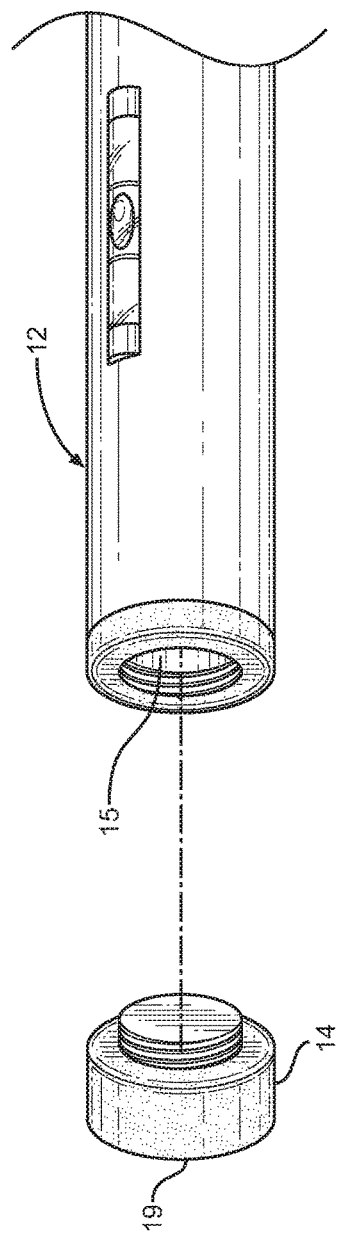
FIG. 2A shows a perspective view of an embodiment of the interior volume of the laser alignment guide.

Referring now to FIG. 2A, there is shown a perspective view of an embodiment of the interior volume of the laser alignment guide. In the illustrated embodiment, the base is configured to engage with the housing 12 via internal threads of the housing 12 and external threads of the base 14. Removing the base 14 exposes the interior volume 15. In some embodiments, the interior volume 15 is configured to store accessories therein. In other embodiments, a carrying case is included to store accessories therein.

Figure 2B:
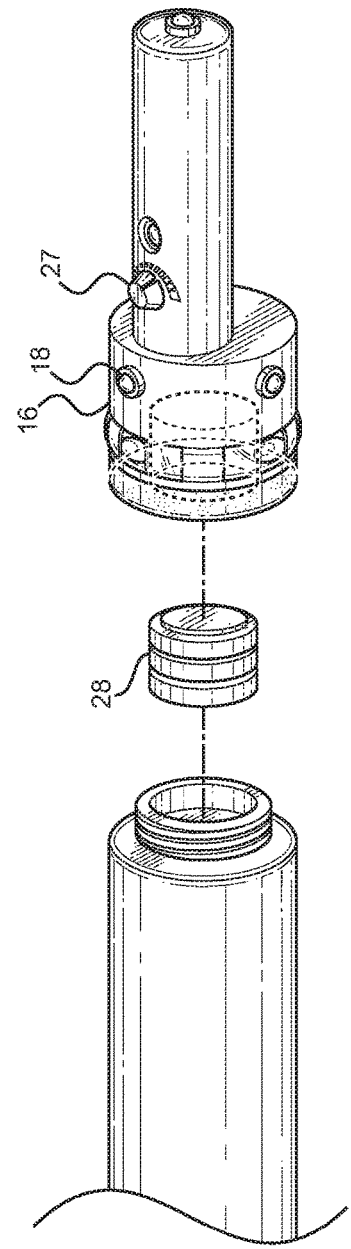
FIG. 2B shows a perspective view of an embodiment of the power source of the laser alignment guide.

Referring now to FIG. 2B, there is shown a perspective view of an embodiment of the power source of the laser alignment guide. The cap 16 further comprises an activation switch 27 in electrical communication with a power source 28 and the light source 18. In the illustrated embodiment, the activation switch 27 comprises a dial configured to vary the intensity of the laser emitted from the light source 18, however in other embodiments, it comprises a button, toggle switch, and the like. The power source 28 is configured to secure within the cap 16 and provide power to the laser alignment guide.

Figure 3B:
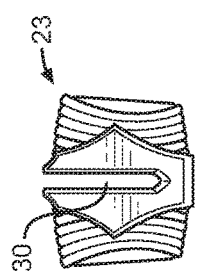
FIG. 3B shows a perspective view of an embodiment of the blade sharpener of the laser alignment guide.
Figure 3C:
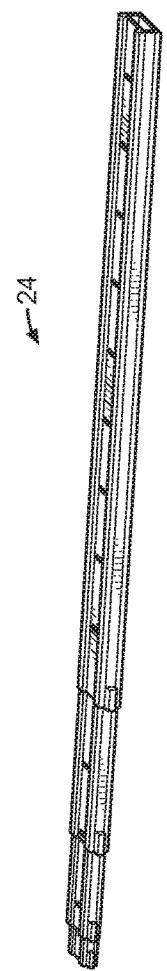
FIG. 3C shows a perspective view of an embodiment of the measuring tool of the laser alignment guide.
Figure 3A:
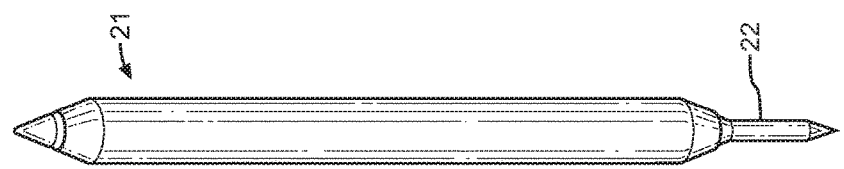
FIG. 3A shows a perspective view of an embodiment of the etching tool of the laser alignment guide.

Referring now to FIGS. 3A, 3B, and 3C, there is shown a perspective view of an embodiment of the etching tool of the laser alignment guide, a perspective view of an embodiment of the blade sharpener of the laser alignment guide, and a perspective view of an embodiment of the measuring tool of the laser alignment guide, respectively. The laser alignment guide further comprises an etching tool 21 having a blade 22 disposed thereon. The blade 22 is configured to score a surface to indicate a desired distance or location measured using the laser alignment guide. In some embodiments, the laser alignment guide further comprises a blade sharpener 23 having a notch 30 configured to hone the blade 22 of the etching tool 21 therein. In some embodiments, the etching tool 21 and blade sharpener 23 are configured to store within the interior volume. In another embodiment, the laser alignment guide further comprises a measuring tool 24 configured to fit within the interior volume. The measuring tool 24 comprises indicia at regular set lengths and is used to determine distance from the laser emitted from the laser alignment guide for conduit installation. In some embodiments, the measuring tool 24 is configured to be telescopic to allow efficient storage within the interior volume.

Figure 4:
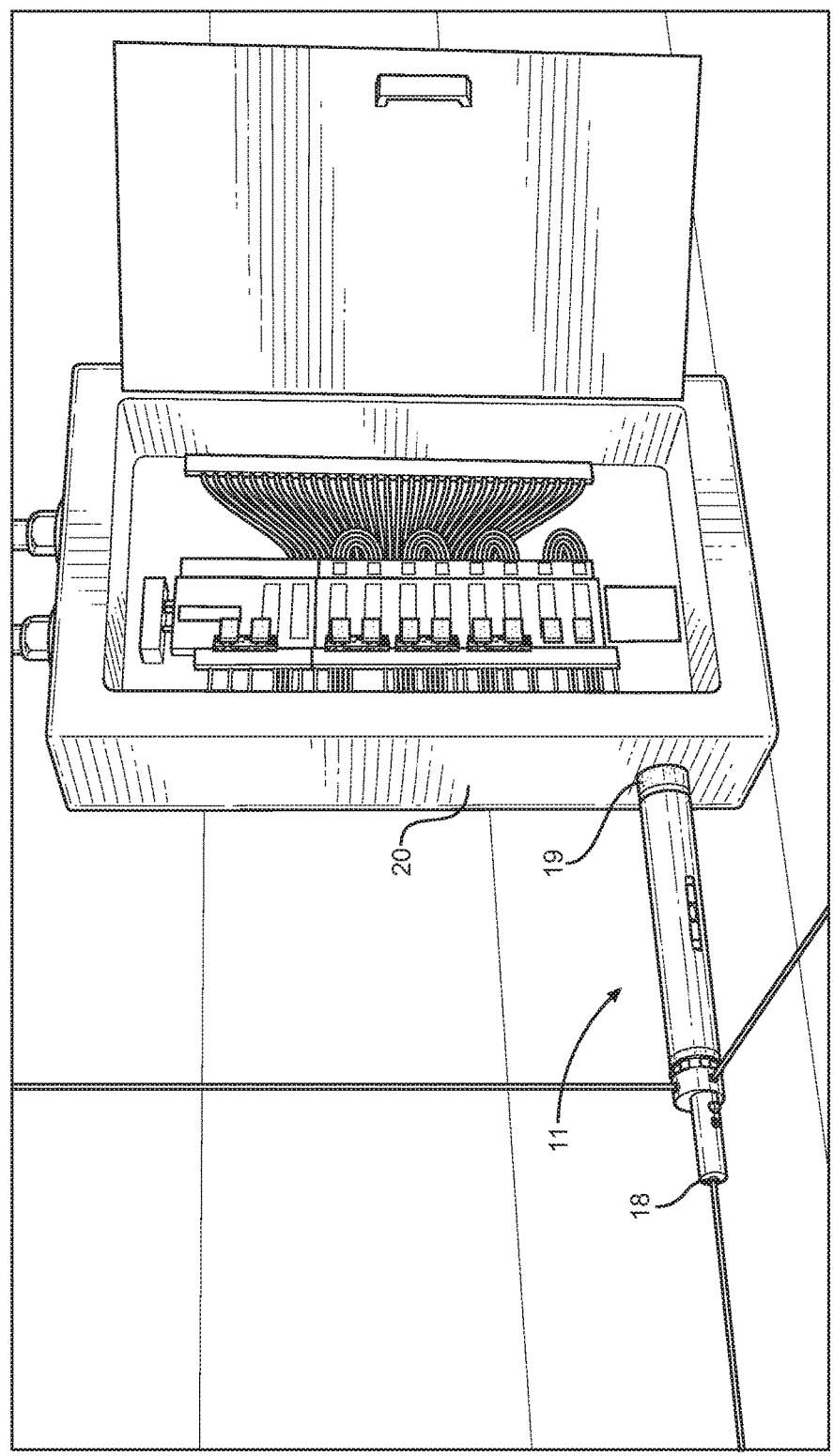
FIG. 4 shows a perspective view of an embodiment of the laser alignment guide in use.

Referring now to FIG. 4, there is shown a perspective view of an embodiment of the laser alignment guide in use. In the illustrated embodiment, the laser alignment guide 11 is removably affixed to a surface 20 via the mounting bracket 19. The laser alignment guide 11 is further secured by fitting within an electrical metal tubing connector disposed on the surface 20. In the illustrated embodiment, the surface 20 is an outer wall of an electrical box, however any surface 20 that requires electrical metal tubing connections is appropriate, such as junction boxes, fuse boxes, or electric water heaters.

In one use, a user needing to install electrical conduit, such as electrical metal tubing, removably affixes the laser alignment guide 11 to the surface 20 of the source of the conduit. The base 14 is inserted into an electrical metal tubing connector and secured to the surface via magnetic attraction by the mounting bracket 19. In some embodiments, the user can place an adaptor over the base 14 in order to effectively increase the width of the base 14 such that it can removably secure within larger electrical metal tubing connectors. Adjustments are then made to the alignment of the laser alignment guide 11 by consulting either the horizontal bubble level 25 or the vertical bubble level 26 to ensure the laser alignment guide 11 is level. The user activates the light source 18 via the activation switch 27, such that a laser is emitted from the cap 16. The laser indicates a straight line from the surface 20. In some embodiments, the user makes use of the included measuring tool 24 to measure distances from the laser to determine the appropriate bend needed in the conduit to create an offset. In this way, a user can accurately measure the bend required to navigate the conduit around obstacles with minimal effort. In some embodiments, the surface adjacent to the laser can be marked using the blade 22 of the etching tool 21 in order to indicate measured points along the trajectory, such as to indicate where the offset begins, or where a fastener is needed to support the conduit.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A laser alignment guide, comprising:
   a housing having at least one sidewall and a base defining an interior volume therein;
   a cap removably securable to an upper end of the housing;
   at least one light source configured to emit a visible laser disposed on the cap;
   a mounting bracket configured to removably secure to a surface disposed on a second end of the housing;

wherein the mounting bracket is configured to removably secure to the surface via magnetic attraction;
an activation switch disposed on the cap wherein the activation switch is in electrical communication with a power source and the light source,
wherein the activation switch comprises a dial configured to vary the intensity of the laser emitted from the light source.

2. The laser alignment guide of claim 1, further comprising an etching tool having a blade configured to score the surface.

3. The laser alignment guide of claim 2, further comprising a blade sharpener configured to sharpen the blade of the etching tool.

4. The laser alignment guide of claim 3, wherein the interior volume is configured to store the etching tool and the blade sharpener.

5. The laser alignment guide of claim 1, further comprising a horizontal bubble level disposed on the sidewall of the housing.

6. The laser alignment guide of claim 1, further comprising a vertical bubble level disposed on the sidewall of the housing.

7. The laser alignment guide of claim 1, further comprising a vertical bubble level disposed on the cap.

8. The laser alignment guide of claim 1, wherein the power source comprises a battery disposed within the interior volume of the housing.

9. The laser alignment guide of claim 1, further comprising a measuring tool configured to fit within the interior volume.

10. The laser alignment guide of claim 9, wherein the measuring tool is telescopic.

11. The laser alignment guide of claim 1, wherein at least one light source is disposed on a sidewall of the housing.

12. The laser alignment guide of claim 11, wherein the light sources are disposed such that the light sources emit a laser in three directions, defining independent axes of a three-dimensional graph.

13. The laser alignment guide of claim 12, wherein the laser is directed through the various light sources by a reflective assembly that is configured to selectively reflect the lasers via rotation of the cap.

14. A laser alignment guide, comprising:
a housing having at least one sidewall and a base defining an interior volume therein;
a cap removably securable to an upper end of the housing;
at least one light source configured to emit a visible laser disposed on the cap,
wherein at least one light source is additionally disposed on a sidewall of the housing;
the light sources are disposed such that the light sources emit a laser in three directions, defining independent axes of a three-dimensional graph,
wherein the laser is directed through the various light sources by a reflective assembly that is configured to selectively reflect the lasers via rotation of the cap;
a mounting bracket configured to removably secure to a surface disposed on a second end of the housing;
wherein the mounting bracket is configured to removably secure to the surface via magnetic attraction;
an activation switch disposed on the cap wherein the activation switch is in electrical communication with a power source and the light source,
wherein the activation switch comprises a dial configured to vary the intensity of the laser emitted from the light source.

* * * * *